United States Patent [19]

Berkovitz

[11] 4,402,488
[45] Sep. 6, 1983

[54] SHEAVE

[75] Inventor: Harry Berkovitz, Glen Rock, N.J.

[73] Assignee: Westinghouse Electric Corp., Pittsburgh, Pa.

[21] Appl. No.: 321,157

[22] Filed: Nov. 13, 1981

[51] Int. Cl.³ .......................... B66D 1/30; B66D 3/04
[52] U.S. Cl. ...................................... 254/371; 187/20; 226/193; 254/390
[58] Field of Search ............... 254/390, 391, 416, 371, 254/372, 278; 474/195, 198, 190, 191; 187/20; 226/190, 193

[56] References Cited

U.S. PATENT DOCUMENTS

| 3,279,762 | 10/1966 | Bruns | 254/266 |
| 4,013,142 | 3/1977 | Hagg | 187/20 |
| 4,030,569 | 6/1977 | Berkovitz | 187/20 |

FOREIGN PATENT DOCUMENTS

| 654536 | 3/1979 | U.S.S.R. | 254/190 |
| 713823 | 2/1980 | U.S.S.R. | 254/372 |

Primary Examiner—Billy S. Taylor
Attorney, Agent, or Firm—D. R. Lackey

[57] ABSTRACT

A sheave for guiding and supporting stranded wire rope. The sheave includes a plurality of circumferential grooves, with treaded elastomeric inserts being disposed in the grooves. The walls which define the treads are disposed at a predetermined angle relative to the circumferential axis of the insert, selected such that they will be substantially perpendicular to the longitudinal axis of a strand, as each strand of the wire rope contacts and extends across a tread. The treads are thus fully compliant with the incremental changes in strand length due to the differential in rope tension on the two sides of the sheave.

2 Claims, 6 Drawing Figures

U.S. Patent    Sep. 6, 1983    4,402,488
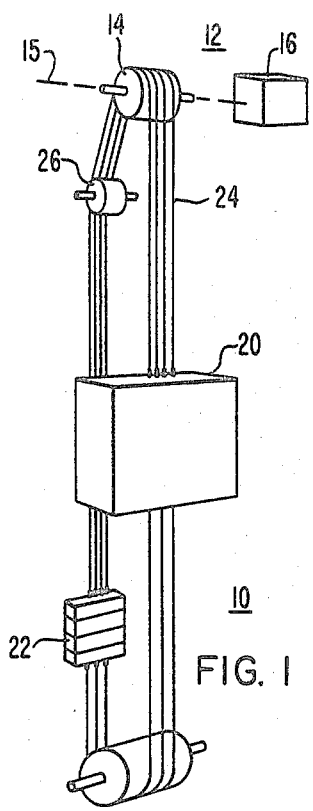
FIG. 1
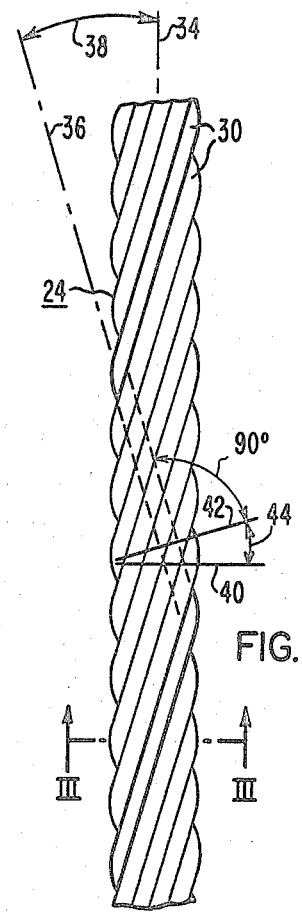
FIG. 2
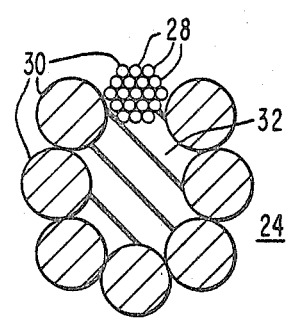
FIG. 3
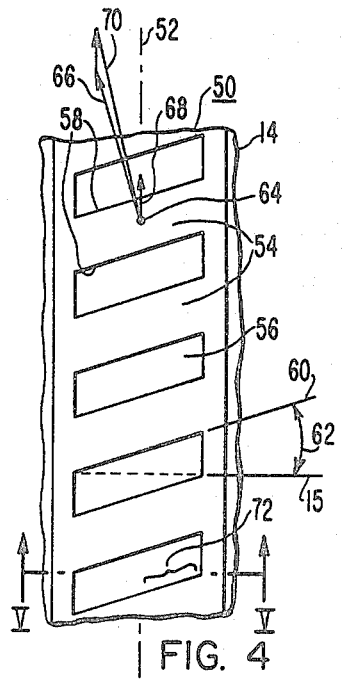
FIG. 4
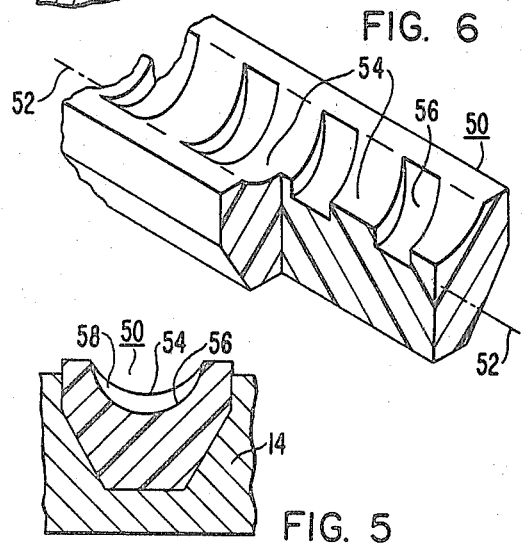
FIG. 6
FIG. 5

SHEAVE

BACKGROUND OF THE INVENTION

1. Field of the Invention

The invention relates in general to sheaves suitable for driving members via the traction developed between stranded wire ropes, which contact the sheave, and more specifically to such sheaves having treaded elastomeric grooves.

2. Description of the Prior Art

The rating of the drive machine connected to drive the sheave of a traction elevator system is determined by the traction efficiency. The traction efficiency may be improved by increasing the tractive effort for a given rope tension, or by maintaining a predetermined tractive effort while reducing the rope tension required to produce it.

While increasing the tractive effort for a given rope tension is desirable, it is only desirable up to a predetermined point, as it is essential that rope slippage occurs when the counterweight reaches an end of its travel path. Treaded elastomeric grooves have been used in the prior art to increase traction efficiency, with the relationship of the surface area of the treads versus the area of the spaces between the treads, being used to select the tractive effort. The tractive effort, however, increases with tread wear, and it is important to replace the elastomeric insert before the wear becomes significant. It would thus be desirable to reduce the wear rate of the treads, in order to extend the useful operating life of the elastomeric treads.

SUMMARY OF THE INVENTION

Briefly, the present invention is a new and improved sheave having treaded elastomeric inserts which define the rope receiving grooves. The spaced treads, instead of being oriented transversely to the rope axis, are skewed at a predetermined angle from this prior art position, such that the longitudinal axes of the twisted rope strands which make up the rope, cross the treads substantially perpendicular to the walls which define each tread. The creep, i.e. differential change in rope length as a function of the rope tensions on the car and counterweight sides, is in the direction of the strands, not in the direction of the rope axis. This is true for both lang lay and regular lay rope. With the prior art orientation of the treads, the treads are not fully compliant in this direction, causing a slight skidding action between the strands and treads which promotes tread wear. This wear is accelerated when the tensions in the ropes are not equal, making the task of equalizing the tension between the ropes very critical. If some ropes have higher tensions than others, the higher tensioned ropes wear one edge of the tread, starting at one side thereof and extending to approximately the midpoint of the tread. By orienting the treads in accordance with the teachings of the present invention, the treads will deflect in the direction of the strands as the strands contact and extend across the treads, eliminating the tendency to skid and shear or erode an edge of the tread. Thus, the sheave of the present invention is more compliant than the prior art tread orientation, accommodating rope creep without sliding or skidding. With a more fully compliant sheave, tension equalization between the plurality of hoist ropes is less critical.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 1 is a perspective view of a traction elevator system having a drive sheave which may utilize the teachings of the invention;

FIG. 2 is a plan view of stranded wire rope of the type utilized for the hoist roping in a traction elevator system;

FIG. 3 is a cross-sectional view of the wire rope shown in FIG. 2, taken between and in the direction of arrows III—III in FIG. 2;

FIG. 4 is a plan view of a section of an elastomeric treaded insert member constructed according to the teachings of the invention;

FIG. 5 is a cross-sectional view of the insert member shown in FIG. 4, and the insert receiving channel or groove of the drive sheave, with the cross-sectional view being taken between and in the direction of arrows V—V in FIG. 4; and FIG. 6 is a perspective view of the elastomeric insert member shown in FIGS. 4 and 5.

DESCRIPTION OF PREFERRED EMBODIMENTS

Referring now to the drawings, and to FIG. 1 in particular, there is shown a perspective view of an elevator system 10 of the traction type, which may utilize the teachings of the invention. Elevator system 10 includes a traction machine 12, which may be geared, or gearless. The traction machine 12 is generally mounted in the penthouse of a structure having a plurality of floors to be served by the elevator system, over a hoistway. Traction machine 12 includes a multiple grooved traction or drive sheave 14 having a rotational axis 15, and a drive 16, which includes an electric drive motor and a brake assembly.

An elevator car 20 is mounted for movement in the hoistway to serve the floors or landings of the associated building or structure. The elevator car 20 is connected to a counterweight 22 by a plurality of wire ropes or cables 24 which pass around the traction sheave 14. A deflection or secondary sheave 26 may be used to properly space the car and counterweight. The ropes 24 are thus held in frictional engagement with the grooves disposed in the periphery of the drive sheave 14 by the weight of the elevator car 20 and counterweight 22.

The elevator system 10 shown in FIG. 1 is roped 1 to 1, i.e., the car moves at the peripheral speed of the traction sheave 14, and the ropes make a half-wrap around the sheave 14, which is also called "single wrap." The invention also applies to 2 to 1 roping systems, and to full or double-wrap arrangements.

FIG. 2 is a plan view of one of the wire ropes 24, and FIG. 3 is an enlarged cross-sectional view of the wire rope 24, illustrating a typical construction thereof. A plurality of steel wires 28 are twisted or "layed around" a center wire to form a strand 30. A plurality of strands 30, such as six or eight, are twisted or layed around a core 32 to complete the stranded wire rope 24. The core 32 is usually a very hard, dense fiber rope. Thus, the strands 30 spiral around the longitudinal axis 34 of the wire rope 24 in a helical path, with any short substantially straight section of a strand having a longitudinal axis 36 disposed at a predetermined angle 38 with respect to the longitudinal axis 34 of the wire rope 24. This angle 38, which may be termed an angle of advance, will be about 20 to 30 degrees, depending upon whether the wire rope has six or eight strands 30. If a line 40 is drawn perpendicular to the longitudinal axis 34 of the wire rope 24, and a line 42 is drawn perpendicular to the longitudinal axis 36 of a strand 30, the angle 44 between these two lines will be equal to the angle 38.

In elastomeric treaded grooves of the prior art, the treads are oriented in the direction of line 40, which may at first seem correct because the longitudinal axis 34 of the wire rope 24 would be perpendicular to the orientation of the treads. Rope creep, however, which is the term for the slight movement between the rope and supporting groove due to the difference between the weight of the elevator car and its load, and the weight of the counterweight, is not in the direction of the rope axis 34, but in the direction of the strands. As hereinbefore stated, the direction of the strands makes a predetermined angle, typically about 20 to 30 degrees relative to the direction of the rope. The rope 34 and strands 30 can only be loaded in tension. Thus, while there is a slight movement of a strand in the direction of the rope, it is insignificant compared with the movement or creep in the direction of the strand. This seems to be substantiated by the wear patterns observed on the prior art transversely oriented elastomeric treads.

FIG. 4 is a fragmentary view of drive sheave 14, illustrating an elastomeric insert member 50 fixed in one of the circumferential grooves thereof, with elastomeric insert member 50 being constructed according to the teachings of the invention. The remaining grooves for supporting the remainder of the hoist ropes would be constructed in a similar manner and thus need not be shown or described in detail. Elastomeric insert member 50, which is preferably formed of polyurethane, has a longitudinal circumferential axis 52 which extends about the periphery of the drive sheave 14, and a plurality of tread members 54 spaced along the axis 52. Valleys or depressions 56 between the treads define spaces which separate adjacent tread members 54, with the walls 58 which define a tread member rising upwardly from the bottom of the valleys 56. Insert member 50 may be fixed in a complementary dimensioned groove of the drive sheave by any suitable means, such as by an adhesive disposed to bond the bottom edge of the insert, and predetermined portions of the side walls, to the mating surfaces of the metallic sheave channel or groove.

FIG. 5 is a cross-sectional view of insert member 50, taken between and in the direction of arrows V—V, and FIG. 6 is a perspective view of elastomeric insert member 50. It will be noted from FIG. 5, that the tread members 54 have a depression which has a round, semicircular configuration for receiving a rope 24, and the valley 56 which defines the spacing between the tread members 54 may also have a circular configuration which extends deeper into the body portion of the insert member. The tractive effort is proportional to the ratio of tread area to the tread area plus the area between the treads. An example of suitable tread widths in the direction of a strand is about 1/6 to 3/16 inch. The spacing between adjacent treads may be about $\frac{1}{8}$ to 3/16 inch, and the tread depth, measured from the center of the tread, may be about $\frac{1}{8}$ inch.

As will be noted most clearly from FIG. 4, the walls 58 which define a tread member 54 are oriented along a line or plane 60 which makes a predetermined angle 62 with the rotational axis 15 of sheave 14. When the wire rope 24 shown in FIG. 2 is placed on elastomeric groove or insert member 50, line 40 corresponds to the rotational axis 15, and line 60 corresponds to line 42. Angle 62 is equal to angle 44, which in turn is equal to angle 38. Thus, the orientation of the tread members 54 is perpendicular to the direction or longitudinal axis 36 of each strand 30, as each strand contacts and extends across a tread member 54 during the operation of the drive system. The tread is thus oriented to perfectly comply the incremental change in strand length during operation of the traction sheave.

If dot 64 in FIG. 4 indicates a point on a strand 30 which is in contact with a tread member 54, the force caused by the creep or incremental change in the length of a strand, which is in the direction of the strand 30, is represented by arrow 66, while the creep component of force in the direction of the rope 24, which is very small, is represented by arrow 68. It will be noted that the resultant force, indicated by arrow 70, is still substantially in the direction of the strand, and thus this force is substantially perpendicular to the orientation of the treads 54. With the orientation of the rope 24 illustrated in FIG. 2, with this orientation being placed on the orientation of the treaded elastomeric insert as shown in FIG. 4, any tread wear observed on the prior art transversely oriented treads would be on the edge 72 of a tread, starting at the end of the tread and extending up to about its midpoint. It is felt that this erosion is caused by a skidding or sliding component of force applied to the tread by the creep force in the direction of the strands, caused by the less than fully compliant orientation of the prior art treads. The disclosed orientation of the tread members, substantially perpendicular to the direction of the contacting strands, minimizes the effect of creepage by making the tread substantially fully compliant with the strands. The creep or forces generated by tractive effort are in the direction the treads are best able to accommodate, with no sliding or skidding of the strands relative to the tread. Thus, the disclosed traction sheave construction will substantially reduce wear and erosion and promote a longer useful operating life for the elastomeric inserts.

I claim as my invention:

1. In a sheave for guiding and supporting stranded wire rope having a plurality of twisted strands whose longitudinal axes are directed at a predetermined angle relative to the longitudinal axis of the wire rope, with the sheave having a rotational axis and a plurality of grooves disposed about its circumference, and including an elastomeric insert in at least certain of the grooves, with said insert having a plurality of wall portions which define a plurality of treads spaced about the circumference of the sheave for contacting a wire rope, the improvement comprising:

the wall portions of said treads being disposed at a predetermined angle relative to the circumferential axis of the insert, with said predetermined angle being selected such that the wall portions will be substantially perpendicular to the longitudinal axis of each strand as it contacts and extends across a tread.

2. In the sheave of claim 1, adhesive means disposed to bond each elastomeric insert in a groove.

* * * * *